Oct. 21, 1958

D. G. JONES 2,857,154

APPARATUS FOR HEAT TREATING TOOTHED ARTICLES
BY HIGH FREQUENCY INDUCTION HEATING

Filed March 22, 1956

2 Sheets-Sheet 1

INVENTOR
DAVID GRIFFITHS JONES

BY Young, Emery & Thompson
ATTORNEYS

Oct. 21, 1958 D. G. JONES 2,857,154
APPARATUS FOR HEAT TREATING TOOTHED ARTICLES
BY HIGH FREQUENCY INDUCTION HEATING
Filed March 22, 1956 2 Sheets-Sheet 2
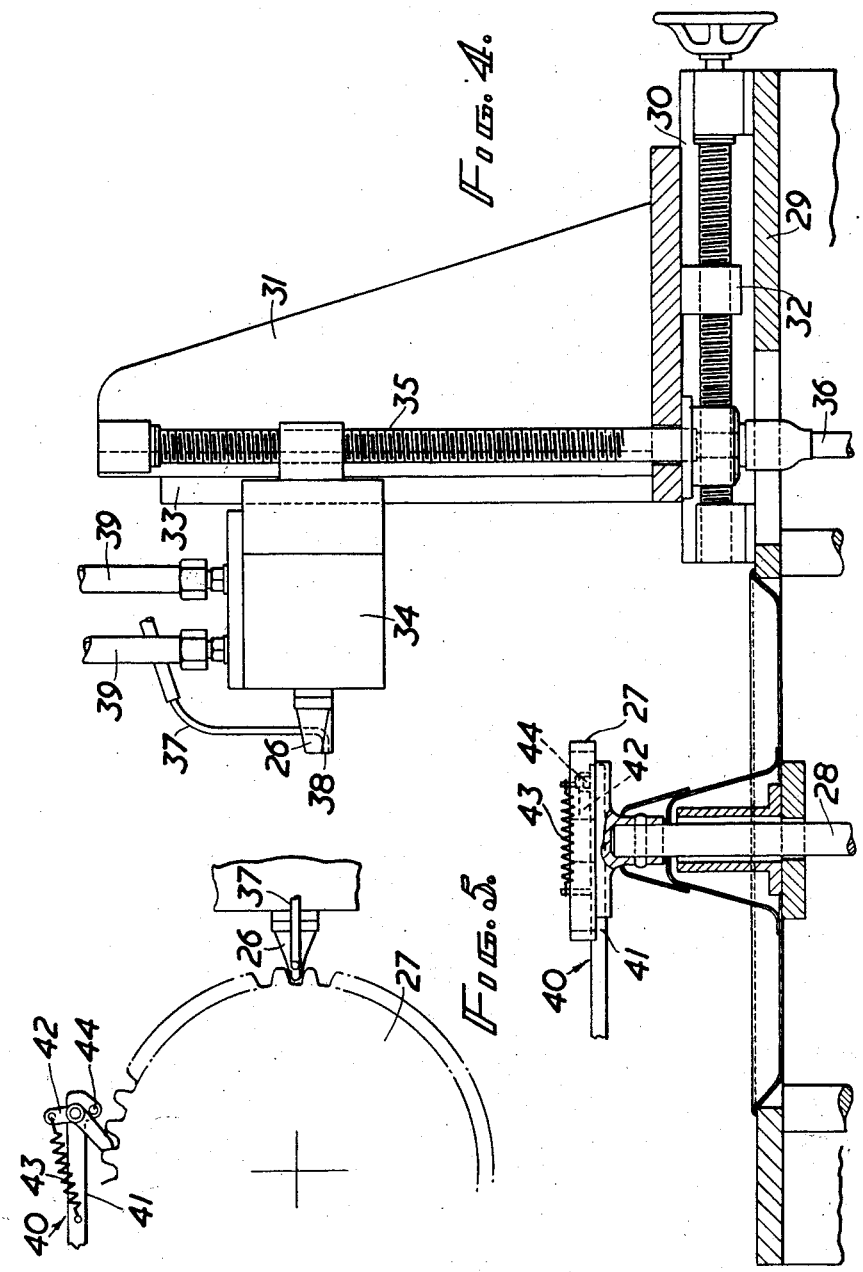
INVENTOR
DAVID GRIFFITHS JONES
BY Young, Emry & Thompson
ATTORNEYS United States Patent Office 2,857,154
Patented Oct. 21, 1958

2,857,154

APPARATUS FOR HEAT TREATING TOOTHED ARTICLES BY HIGH FREQUENCY INDUCTION HEATING

David Griffiths Jones, Cheltenham, England, assignor to Delapena & Son Limited, Cheltenham, England Application March 22, 1956, Serial No. 573,179

Claims priority, application Great Britain November 30, 1950

5 Claims. (Cl. 266—4)

This invention relates to the heat treatment by high frequency induction heating of articles having teeth formed thereon, the term "high frequency" being used herein to include normal high frequencies, for example in the region of 10,000 cycles, and radio frequencies.

The main object of the invention is to provide apparatus which will effect hardening of the toothed portion of the article rapidly and substantially without distortion.

According to the invention apparatus for heat treating by high frequency induction heating articles having teeth formed thereon comprises the combination of an inductor having a heating face of considerably less depth than the width of the teeth of the article from the front to the back of the latter, means for effecting relative movement between the article and the inductor so that the latter can be projected into a tooth space of the article and progressively scan a tooth flank longitudinally from front to back of the article, and means for supplying high frequency current to said inductor to which said current is fed to heat the tooth flank during relative movement between the article and the inductor only in one direction whereupon said current is cut off and relative movement in the opposite direction is effected to return the article and the inductor to their original positions. The various adjacent pairs of tooth flanks and connecting trough portions of the tooth spaces may be heated separately, one tooth space at a time, and to enable this to be done means may be provided for indexing said article to enable each tooth flank to be brought sequentially into alignment with the inductor and to be traversed from end to end thereby until the desired number of teeth have been treated.

Figure 1:
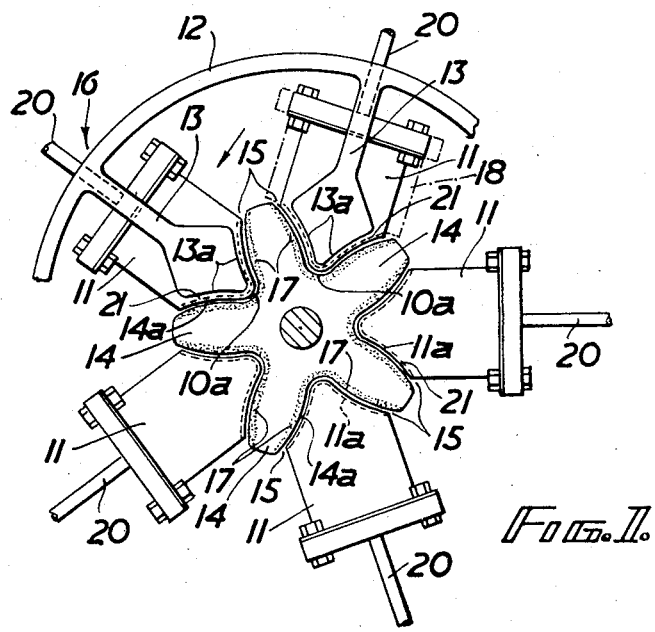
Figures 2, 3:
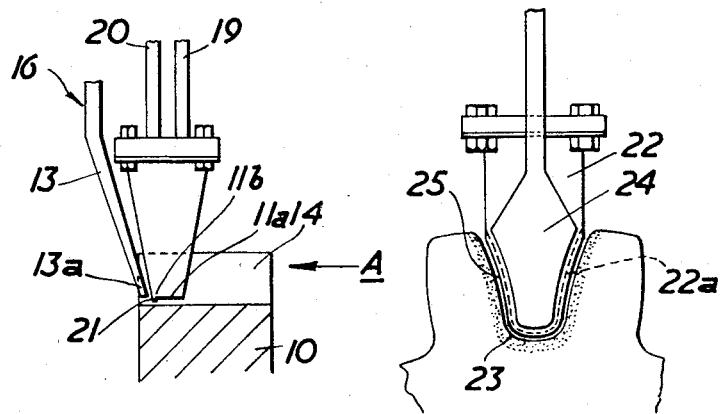

Embodiments of apparatus constructed in accordance with the invention and intended for hardening circular articles having teeth formed thereon, such as gearwheels, by radio frequency induction heating will now be described, by way of example, with reference to the accompanying drawings, in which:

Figure 1 illustrates a plurality of inductors arranged radially around a spur gearwheel so that all the teeth of the latter can be hardened simultaneously, Figure 2 is a view of one of the inductors shown in Figure 1 in the direction of the arrow in that figure, Figure 3 illustrates two adjacent teeth of a large gearwheel which is heated and quenched, one section at a time, by means of a single inductor, work coil and quenching arrangement, Figure 4 is a broken side elevation, partly in section, of apparatus for hardening the margins of the tooth spaces of a gearwheel one at a time, and Figure 5 is a broken plan view of the inductor and part of the gearwheel illustrated in Figure 4.

Referring to Figures 1 and 2 of the drawings, the apparatus shown therein is arranged so that the flanks and troughs of the teeth of a small straight spur gearwheel 10 are all hardened in one operation. To this end a plurality of inductors 11, corresponding in number to the number of tooth spaces 10a of the gearwheel, are arranged radially around the latter, each inductor comprising a flux-concentrating core and an induction coil. The inner ends 11a of the inductors are profiled to approximately the same form as the tooth spaces 10a of the gearwheel so that a gap is left between the inner profiled ends of the radially arranged inductors corresponding substantially to the profile of the gearwheel 10, the radial spacing of the inductors being such that a clearance of approximately 1 mm. is left between the profiled inner ends of the inductors and the edges of the tooth spaces. By making the lateral dimensions of the inductors somewhat less than the pitch of the teeth 14 of the gearwheel gaps 15 are left between the adjacent unprofiled portions of the inductors the profiled ends 11a of which are accordingly only contiguous to the flanks and troughs defining the tooth spaces 10a. The induction coils of the inductors are wound in series with all the coils phased so that phase cancellation cannot occur.

Quenching liquid for the heated surfaces of the gearwheel is fed through a pipe in the form of a ring 12 (only a portion of which is illustrated) surrounding the gearwheel, the liquid passing inwardly from such ring through discharge pipes 13 the open ends of which are flattened, splayed outwardly and shaped, as shown at 13a, to conform to the tooth spaces 10a of the gearwheel so that the heated portions of the latter are sprayed by a curtain of quenching liquid. The quench water ring assembly 16 formed by the pipes 12 and 13 is fixedly mounted in relation to the inductors 11. Cooling of the latter is effected by a fluid medium and inlet and outlet pipes 19, 20 are provided to allow the cooling medium access to the interior of the inductors.

Preferably, and as illustrated, the inductors 11 are of less depth from front to rear than the width of the teeth 14 of the gearwheel, as shown clearly in Figure 2. This results in the heated area of the article being confined to a narrow band which extends down the flank of one tooth, across the trough dividing it from the adjacent tooth, and up the flank of the latter. To enable the entire tooth width to be heated, relative movement between the gearwheel and the inductor is effected so that the profiled ends 11a of the inductors progressively scan the width of the gearwheel from end to end. In the embodiment illustrated the gearwheel is traversed axially through the inductors 11 and the quench water ring assembly 16 from the front, i. e. in the direction of the arrow A in Figure 2, but it will be appreciated that alternatively the inductors and quench water ring could be traversed axially of the gearwheel. During such relative traversing movement the flanks 14a of the teeth and the troughs 10a of the intervening tooth spaces are progressively heated and immediately quenched from end to end, with respect to the thickness of the gearwheel, whilst the tip portions of the teeth are left substantially unheated and therefore remain unhardened, a hardness pattern 17 being thereby produced which comprises a number of disconnected hardened layers of substantially U or V form corresponding in number to the number of tooth spaces of the gearwheel 10. If it is desired to harden the tips of the teeth 14 as well as the flanks and tooth spaces and thus produce a hardness pattern in the form of a narrow band extending inwardly around the complete gearwheel profile, the lateral dimensions of the inductors 11 may be increased, as shown in broken lines at 18 in Figure 1, so that the gaps 15 between the adjacent unprofiled ends of the inductors are reduced as much as possible.

The temperature of any given portion of the periphery of the gearwheel 10 rises as the profiled ends 11a of the inductors traverse such portion and reaches its maximum just as the rear ends 11b of these profiled ends pass over it, the heated portion being then at its correct quenching temperature. If the quenching liquid is allowed to splash forwardly of the rear ends 11b of the profiled ends so that spots of fluid fall on the surface of the wheel before this surface has reached the correct quenching temperature the resulting hardened surface will be patchy, in addition to which difficulty may be experienced in raising the temperature of the surface to be hardened to a sufficient extent. Forward splashing of the quenching liquid is therefore prevented by splash guards 21 attached to the rear ends 11b of the profiled ends of the inductors, such splash guards extending transversely along said rear ends and projecting outwardly therefrom for a distance of approximately .020 in. to .030 in. towards the surface of the teeth 14 so that the outer edges of the splash guards are just held from making contact with the tooth surfaces and form a liquid seal.

Although the heating and quenching of all the teeth of the gearwheel simultaneously is preferred in the case of gearwheels or pinions having a small number of teeth as already described, in the case of larger gearwheels or other multi-toothed articles, such as straight toothed racks, the various adjacent pairs of tooth flanks and connecting trough portions of the tooth spaces may be heated separately, one tooth space at a time, by means of a single inductor, as illustrated for example in Figure 3. In this arrangement an inductor 22 is provided with a profiled end 22a which fits into the tooth spaces 23 of the serrated article, the inductor being provided with a quenching arrangement 24 and splash guard 25, all as previously described. In order to confine the heated area of the serrated article to a narrow band as previously described, the profiled end 22a of the inductor is of less depth from front to rear than the teeth of the article. By relatively increasing or decreasing the relative width of the inductor 22 and the tooth spaces 23 the tips of the gear teeth may be hardened or left unhardened as desired.

Alternatively, as a half-way measure between the arrangements of Figures 1 and 3, the teeth of a large gearwheel or of a toothed rack may be treated several at a time by the use of suitably grouped inductors, quenching arrangements and splash guards according to the invention.

Figures 4 and 5 illustrate apparatus for relatively positioning an inductor 26 having a flux-concentrating core and the article to be hardened, in this case a gearwheel 27, so that the profiled end of the inductor projects into a tooth space of the gearwheel which is heated by the inductor one tooth space at a time. The gearwheel 27 is detachably mounted in a horizontal position on the upper end of a shaft 28 rotatably carried by the bed 29 of the machine, indexing means 40 being provided to enable each tooth space of the wheel to be brought sequentially into alignment with the inductor 26. Such indexing means comprise a rod 41 slidably supported from the bed 29 of the machine and which carries at its free end a pivoted pawl 42 loaded by means of a tension spring 43 against a stop 44. Sliding movement of the rod 41 away from the inductor 26 moves the gearwheel 27 angularly through a distance corresponding to one tooth space, movement of the rod in the opposite direction causing the pawl 42 to slide over the tooth against the spring loading and engage with the flanks of the teeth defining the next tooth space. During retrograde movement of the rod 41 angular movement of the gearwheel 27 is prevented in any convenient manner, for example by means of a brake (not illustrated) in the shaft 28.

Slidably mounted on horizontal guides 30 on the bed 29 are two spaced vertical support members 31 and these members can be slid towards or away from the shaft 28 in a direction radial of the latter by screw and nut mechanism 32 to enable wheels of various diameters to be dealt with. Each support member 31 is provided with a vertical guide 33, such guide supporting a slide member 34 which may house a transformer and to the front of which the inductor 26 is detachably and interchangeably secured. Vertical sliding movement of the member 34 and the inductor is effected by a vertically arranged screw 35 driven by a flexible shaft 36, rotation of the screw causing the inductor to rise or fall as desired so that its profiled end can be projected into a tooth space of the gearwheel, as shown clearly in Figure 5, and caused to longitudinally traverse the tooth space from bottom to top. The inductor 26 has a heating face of considerably less depth than the width of the teeth of the gearwheel 27 from the front to the back of the latter so that the core concentrates a high power density into a narrow hot line extending down one of the tooth flanks defining the tooth space, across the trough of the latter and up the adjacent tooth flank on the opposite side of the tooth space. High frequency current is fed to the inductor as it traverses the tooth space from bottom to top so that the tooth flanks and trough defining the tooth space are simultaneously heated. At the conclusion of the heating step the screw 35 is rotated in the opposite direction to return the inductor to its original position, the high frequency current being switched off during such return movement, and the gearwheel 27 is indexed to the next position. A pipe 37 for the supply of quenching fluid is rigidly carried by the inductor 26, such pipe terminating in a nozzle 38 disposed below the profiled end of the inductor. Hollow leads 39 serve to supply current and cooling water to the transformer.

The flux-concentrating core of the inductors may be of powdered magnetic material, for example a dust-iron core as used in radio frequency work, or alternatively it may be built up from thin steel laminae enclosed in a casing as described in the specification of my application Serial No. 258,968 and in my Patent No. 2,768,269. The latter arrangement is illustrated herein.

By utilizing the grouped arrangement of inductors and series wound induction coils described the hardening of small pinions may be carried out rapidly in virtually a single operation while using an R. F. induction generator of relatively low power.

I claim:

1. In apparatus for hardening a gearwheel by high frequency induction heating, the combination of an inductor, a mounting shaft for the gearwheel on which the latter is mounted so as to be rotatable about its axis, a slide member carrying said inductor and to which the latter is detachably and interchangeably secured to project therefrom, means for effecting relative movement in a direction axially of the gearwheel between the mounting shaft and the slide member to enable the inductor to be projected into a tooth space of the gearwheel and progressively scan a tooth flank of the latter longitudinally from front to back, means for effecting movement of said slide member in a direction radially of the gearwheel to enable gearwheels of various diameters to be dealt with, means carried by said slide member for supplying high frequency current to the inductor, means for indexing the gearwheel to enable the inductor to be projected into each tooth space, and quenching means carried by the slide member.

2. The structure of claim 1 and further including a transformer carried by said slide member for supplying the high frequency current to the inductor and to which high frequency current and cooling fluid are fed by said supply means, vertical guide means for said slide member along which the latter is slid to effect said movement axially of the gearwheel, and screw and nut mechanism for effecting vertical movement of the slide member along the guide means, the mounting shaft being arranged vertically and rotatably on the apparatus.

3. The combination of claim 1 in which the depth of the heating face of the inductor relative to the width of the teeth of the article is such as to concentrate the heating effect thereof in a relatively narrow band which is caused to traverse the width of the tooth progressively from front to back.

4. The combination of claim 1 in which the inductor is in the form of a loop with the polar axis of the loop extending substantially normal to the planes of the adjacent flanks of two adjacent teeth.

5. The combination of claim 1 in which the inductor is in the form of a loop with the polar axis of the loop extending in a direction substantially normal to the planes of the adjacent flanks of two adjacent teeth, and in which the said inductor is provided with a flux-concentrating core.

References Cited in the file of this patent

UNITED STATES PATENTS

| | | |
|---|---|---|
| 2,338,496 | Denneen et al. | Jan. 4, 1944 |
| 2,521,699 | Denneen et al. | Sept. 12, 1950 |
| 2,582,929 | Gridley | Jan. 15, 1952 |

FOREIGN PATENTS

| | | |
|---|---|---|
| 903,615 | Germany | Dec. 24, 1953 |